US011471250B2

(12) United States Patent
Kuo et al.

(10) Patent No.: US 11,471,250 B2
(45) Date of Patent: Oct. 18, 2022

(54) REINFORCED ALIGNER HOOKS

(71) Applicant: Align Technology, Inc., San Jose, CA (US)

(72) Inventors: Eric Kuo, San Jose, CA (US); Artem Borovinskih, Union City, CA (US); Shiva Sambu, Santa Clara, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 17/227,158

(22) Filed: Apr. 9, 2021

(65) Prior Publication Data
US 2021/0228318 A1 Jul. 29, 2021

Related U.S. Application Data

(60) Continuation of application No. 17/163,144, filed on Jan. 29, 2021, which is a continuation of application
(Continued)

(51) Int. Cl.
G06T 15/00 (2011.01)
A61C 7/00 (2006.01)
(Continued)

(52) U.S. Cl.
CPC .............. A61C 7/002 (2013.01); A61C 7/08 (2013.01); B33Y 50/02 (2014.12); G06F 30/20 (2020.01); A61C 9/0046 (2013.01)

(58) Field of Classification Search
CPC ......... G06T 7/00; G06T 7/001; G06T 7/0014; G06T 2207/10116; A61C 7/00; A61C 7/0012; G06F 3/48
(Continued)

(56) References Cited

U.S. PATENT DOCUMENTS 5,820,368 A    10/1998 Wolk
5,975,893 A *  11/1999 Chishti ................. A61C 9/004
(Continued)

OTHER PUBLICATIONS

Zhang DQ, Su JH, Xu LY, Zhong PP. 3D finite element study of en masse retraction of maxillary anterior teeth in two typical force directions. Chin J Dental Res. Jan. 1, 2008;11:101-7. (Year: 2008).*

Primary Examiner — Phu K Nguyen
(74) Attorney, Agent, or Firm — Wilson Sonsini Goodrich & Rosati

(57) ABSTRACT

Orthodontic positioning devices, and related methods and systems, are disclosed for use with one or more orthodontic elastic members. The disclosed devices are configured to couple with an orthodontic elastic member so as to react a force from the elastic member into the appliance to, for example, generate traction forces on the patient's teeth to produce a desired occlusion. A positioning device includes a patient removable tooth positioning appliance having teeth receiving cavities shaped to receive and apply a resilient positioning force to a patient's teeth. The appliance includes a hook configured to interface with an orthodontic elastic member. The hook can be configured to be offset from a surface of a tooth when the appliance is coupled with the patient's teeth and no elastic member is coupled with the tooth. The hook can be curved so that the hook is more retentive on the aligner. The hook can be reinforced so that the reinforcement resists deformation when the elastic is in place.

23 Claims, 12 Drawing Sheets

Related U.S. Application Data

No. 16/285,004, filed on Feb. 25, 2019, now Pat. No. 10,912,627, which is a continuation of application No. 14/951,245, filed on Nov. 24, 2015, now Pat. No. 10,271,923, which is a division of application No. 12/772,130, filed on Apr. 30, 2010, now abandoned.

(51) Int. Cl.
*A61C 7/08* (2006.01)
*G06F 30/20* (2020.01)
*B33Y 50/02* (2015.01)
*A61C 9/00* (2006.01)

(58) Field of Classification Search
USPC .......................................................... 345/418
See application file for complete search history.

(56) References Cited

U.S. PATENT DOCUMENTS

| | | |
|---|---|---|
| 6,183,248 B1 | 2/2001 | Chishti et al. |
| 6,309,215 B1 | 10/2001 | Phan et al. |
| 6,386,864 B1 | 5/2002 | Kuo |
| 6,450,807 B1 | 9/2002 | Chishti et al. |
| 6,454,565 B2 | 9/2002 | Phan et al. |
| 6,471,511 B1 * | 10/2002 | Chishti .................... A61C 7/00 |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 6,971,873 B2 * | 12/2005 | Sachdeva .............. G16H 50/50 433/24 |
| 7,074,039 B2 | 7/2006 | Kopelman et al. |
| 7,077,646 B2 * | 7/2006 | Hilliard .................... A61C 7/00 433/6 |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,361,017 B2 * | 4/2008 | Sachdeva ............... G06T 19/00 433/24 |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,060,236 B2 * | 11/2011 | Hilliard .................... G16Z 99/00 700/160 |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,241,775 B2 * | 1/2016 | Romano .................. A61C 7/28 |
| 9,326,831 B2 | 5/2016 | Cheang |
| 9,433,476 B2 | 9/2016 | Khardekar et al. |
| 9,610,140 B2 * | 4/2017 | Anderson ................ A61C 9/00 |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,085,823 B2 * | 10/2018 | Cao ......................... A61C 7/08 |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,690 B2 * | 2/2020 | Wen ......................... A61C 7/08 |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,729,515 B2 * | 8/2020 | Kuo ........................ B33Y 50/02 |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,486 B2 * | 1/2021 | Wen ......................... A61C 7/08 |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 2002/0156652 A1 * | 10/2002 | Sachdeva ............. A61C 9/0053 705/2 |
| 2002/0192617 A1 | 12/2002 | Phan et al. |
| 2004/0161722 A1 * | 8/2004 | Lai ........................... A61C 7/00 433/24 |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0078842 A1 * | 4/2006 | Sachdeva ............. A61C 9/0053 433/24 |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0020337 A1 * | 1/2008 | Phan ........................ A61C 7/08 433/6 |
| 2008/0118882 A1 | 5/2008 | Su |
| 2008/0160473 A1 | 7/2008 | Li et al. |
| 2008/0268400 A1 | 10/2008 | Moss et al. |
| 2008/0286716 A1 | 11/2008 | Sherwood |

(56) References Cited

U.S. PATENT DOCUMENTS

| | | |
|---|---|---|
| 2008/0286717 A1 | 11/2008 | Sherwood |
| 2009/0191502 A1* | 7/2009 | Cao .................. A61C 7/08 433/24 |
| 2009/0280450 A1 | 11/2009 | Kuo |
| 2010/0055635 A1 | 3/2010 | Kakavand |
| 2010/0092905 A1* | 4/2010 | Martin .................. A61C 7/00 433/18 |
| 2010/0129763 A1 | 5/2010 | Kuo |
| 2014/0067334 A1 | 3/2014 | Kuo |
| 2014/0272749 A1* | 9/2014 | Yick .................. A61C 7/14 433/8 |
| 2015/0004554 A1* | 1/2015 | Cao .................. A61C 7/08 433/6 |
| 2015/0128421 A1* | 5/2015 | Mason .................. A61C 7/002 29/896.11 |
| 2015/0265376 A1 | 9/2015 | Kopelman |
| 2015/0366637 A1 | 12/2015 | Kopelman et al. |
| 2015/0366638 A1 | 12/2015 | Kopelman et al. |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007365 A1 | 1/2017 | Kopelman et al. |
| 2017/0007366 A1 | 1/2017 | Kopelman et al. |
| 2017/0007386 A1 | 1/2017 | Mason et al. |
| 2017/0100216 A1* | 4/2017 | Cinader, Jr ............ A61C 7/006 |
| 2017/0112594 A1* | 4/2017 | Hilliard ................ A61C 9/0053 |
| 2017/0135792 A1 | 5/2017 | Webber |
| 2017/0135793 A1 | 5/2017 | Webber et al. |
| 2017/0165032 A1 | 6/2017 | Webber et al. |
| 2017/0224442 A1* | 8/2017 | Kuo .................. A61C 7/08 |
| 2017/0319296 A1 | 11/2017 | Webber et al. |
| 2018/0153648 A1 | 6/2018 | Shanjani et al. |
| 2018/0153733 A1 | 6/2018 | Kuo |
| 2018/0168776 A1 | 6/2018 | Webber |
| 2018/0353264 A1 | 12/2018 | Riley et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0069975 A1 | 3/2019 | Cam et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0338067 A1 | 11/2019 | Liska et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

\* cited by examiner

REINFORCED ALIGNER HOOKS

CROSS-REFERENCE

This application is a continuation of U.S. application Ser. No. 17/163,144, filed Jan. 29, 2021, which application is a continuation of U.S. application Ser. No. 16/285,004, filed Feb. 25, 2019, now U.S. Pat. No. 10,912,627, issued Feb. 9, 2021, which application is a continuation of U.S. application Ser. No. 14/951,245, filed Nov. 24, 2015, now U.S. Pat. No. 10,271,923, issued Apr. 30, 2019, which application is a divisional of U.S. application Ser. No. 12/772,130, filed Apr. 30, 2010, now abandoned, each of which are incorporated herein by reference in their entirety and to which applications we claim priority under 35 U.S.C. § 120.

BACKGROUND

The present invention relates generally to the field of orthodontics, and more particularly to dental positioning appliances configured to interface with an orthodontic elastic member and react a force from the elastic member into the appliance.

An objective of orthodontics is to move a patient's teeth to positions where function and/or aesthetics are optimized. Traditionally, appliances such as braces are applied to a patient's teeth by a treating practitioner and the set of braces exerts continual force on the teeth and gradually urges them toward their intended positions. Over time and with a series of clinical visits and adjustments to the braces, the practitioner adjusts the appliances to move the teeth toward their final destination.

More recently, alternatives to conventional orthodontic treatment with traditional affixed appliances (e.g., braces) have become available. For example, systems including a series of preformed appliances/aligners have become commercially available from Align Technology, Inc., Santa Clara, Calif., under the tradename Invisalign® System. The Invisalign® System is described in numerous patents and patent applications assigned to Align Technology, Inc. including, for example in U.S. Pat. Nos. 6,450,807, and 5,975,893, as well as on the company's website, which is accessible on the World Wide Web (see, e.g., the url "www.invisalign.com"). The Invisalign® System includes designing and/or fabricating multiple, and sometimes all, of the aligners to be worn by the patient before the aligners are administered to the patient and used to reposition the teeth (e.g., at the outset of treatment). Often, designing and planning a customized treatment for a patient makes use of computer-based 3-dimensional planning/design tools, such as Treat™ software from Align Technology, Inc. The design of the aligners can rely on computer modeling of a series of planned successive tooth arrangements, and the individual aligners are designed to be worn over the teeth and elastically reposition the teeth to each of the planned tooth arrangements.

While recently developed orthodontic treatment technologies, such as those described above, represent a considerable advancement in the field of orthodontics, additional advancements remain of interest. For example, in some instances it may be advantageous to use an orthodontic elastic member to generate a tension force between a patient's upper and lower teeth to bring the teeth into a desired occlusion. In some traditional approaches, brackets are bonded to the teeth and an orthodontic elastic member is used to couple the brackets to generate the tension force. Generating such a tension force in conjunction with recently developed orthodontic approaches can be challenging. For example, shell aligners are generally designed to match the geometry of a patient's teeth, thereby leaving little room for bonding such brackets to a patient's teeth. As such, there is a need for shell aligners that can be used in conjunction with an orthodontic elastic member to, for example, bring a patient's teeth into a desired occlusion.

BRIEF SUMMARY

The present disclosure provides orthodontic positioning appliances for use with an orthodontic elastic member, and related systems and methods. The disclosed positioning appliances are configured to couple with an orthodontic elastic member so as to react a force from the elastic member into the appliance. Such appliances can advantageously employ the force imparted by the elastic member to apply desired repositioning forces to a patient's teeth to, for example, generate a desired occlusion and/or supplement repositioning forces generated by the appliance.

For a fuller understanding of the nature and advantages of the present invention, reference should be made to the ensuing detailed description and accompanying drawings. Other aspects, objects and advantages of the invention will be apparent from the drawings and detailed description that follows.

DETAILED DESCRIPTION

Figure 1:
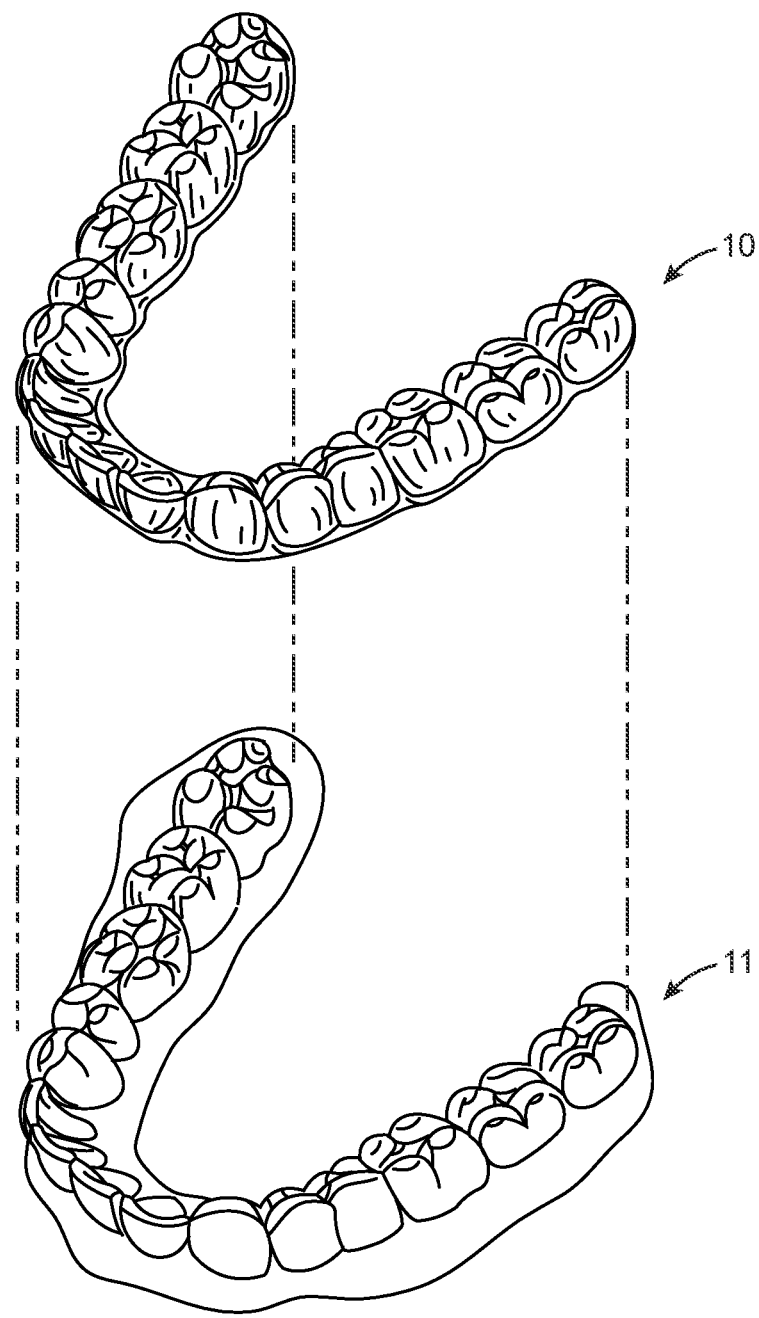
FIG. 1 illustrates a jaw and an incremental positioning appliance for the jaw, in accordance to an embodiment.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Orthodontic positioning appliances are provided that can be used in conjunction with one or more orthodontic elastic members, as well as related methods and systems. During orthodontic treatment, it may be necessary to apply forces to a tooth to generate movement of the tooth to, for example, bring the patient's teeth into a better occlusion. The presently disclosed appliances, methods, and systems provide means by which such forces can be applied during orthodontic treatment where appliances having teeth receiving cavities are used, such as preformed appliances/aligners available from Align Technology, Inc., Santa Clara, Calif., under the tradename Invisalign® System.

The disclosed orthodontic positioning appliances for use with an orthodontic elastic member include, for example, a patient removable tooth positioning appliance having teeth receiving cavities shaped to receive and apply a resilient positioning force to a patient's teeth. The positioning appliance can include a hook configured to interface with an orthodontic elastic member so as to react a force from the elastic member into the patient-worn appliance, thereby applying (e.g., supplementing) forces other than or in addition to the forces applied to the patient's teeth and generated solely by the positioning appliance(s) in the absence of the coupled elastic member. The appliance and/or hook thereof can be configured to more optimally engage an elastic member when the appliance is worn by the patient. In one embodiment, for example, the hook can be configured to be laterally offset from another portion of the appliance, such as a portion of the appliance that engages the patients teeth when worn. For example, a hook can be offset (e.g., laterally offset) from a portion of the appliance that engages a buccal surface of a tooth when the appliance is coupled with the patient's teeth. In such an embodiment, the hook will be offset even when no orthodontic elastic member is coupled with the tooth.

In another embodiment, an appliance can be configured such that the hook is gingivally offset from a portion of the appliance. For example, certain shell-type appliances will include a gingival edge or edge of the appliance that, when worn by a patient, is disposed substantially along the gingival line or margin where gingival tissue meets the tooth crown at the base of the tooth. In certain embodiments, a hook of an appliance will be gingivally offset or offset in a gingival direction relative to the gingival edge of the appliance. Such a configuration advantageously allows incorporation of the hook into the appliance structure, but without necessarily reducing tooth receiving/engaging surfaces of an appliance cavity.

An appliance can include a reinforcement structure selected and/or disposed on the appliance so as to stiffen the appliance against lateral deflection induced by the force from the elastic member. For example, a portion of the appliance can include a corrugation to stiffen the appliance. In another embodiment, the appliance can include a locally stiffened area (e.g., via an added shape or contour) connected with the hook to stiffen the hook against deflection (e.g., lateral deflection) induced by the force from the elastic member.

Referring now to the drawings, in which like reference numerals represent like parts throughout the several views, FIG. 1 provides an appropriate starting point in a discussion of the present invention with respect to tooth repositioning appliances designed to apply repositioning forces to teeth. A tooth repositioning appliance 10 can be worn by a patient in order to achieve an incremental repositioning of individual teeth in the jaw 11. The appliance can include a shell (e.g., polymeric shell) having teeth-receiving cavities that receive and resiliently reposition the teeth. In many embodiments, a polymeric appliance can be formed from a thin sheet of suitable elastomeric polymeric material, such a 0.03 inch thermal forming dental material by Tru-Tain Plastics, Rochester, Minn. An appliance can fit over all teeth present in an upper or lower jaw, or less than all of the teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment.

Teeth that are moved can also serve as a base or anchor for holding the appliance as it is worn by the patient. Typically, no wires or other means will be provided for holding an appliance in place over the teeth. In some cases, however, it may be desirable or necessary to provide individual anchors on teeth with corresponding receptacles or apertures in the appliance so that the appliance can apply a selected force on the tooth. Exemplary appliances, including those utilized in the Invisalign® System, are described in numerous patents and patent applications assigned to Align Technology, Inc. including, for example in U.S. Pat. Nos. 6,450,807, and 5,975,893, as well as on the company's website, which is accessible on the World Wide Web (see, e.g., the url "www-.invisalign.com").

An appliance can be designed and/or provided as part of a set or plurality of appliances. In such an embodiment, each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment, which may include where surgery is recommended, where inter-proximal reduction (IPR) is appropriate, where a progress check is scheduled, where anchor placement is best, where palatal expansion is desirable, etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages. The adjustment appliances can be generated all at the same stage or in sets or batches, e.g., at the beginning of a stage of the treatment, and the patient wears each appliance until the pressure of each appliance on the teeth can no longer be felt or has resulted in the maximum amount of expressed tooth movement for that given stage. A plurality of different appliances (e.g., set) can be designed and even fabricated prior to the patient wearing any appliance of the plurality. After wearing an appliance for an appropriate period of time, the patient replaces the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement, i.e., have a geometry which would (if fully achieved) move individual teeth beyond the tooth arrangement which has been selected as the "final." Such over-correction may be desirable in order to offset potential relapse after the repositioning method has been terminated, i.e., to permit movement of individual teeth back toward their pre-corrected positions. Over-correction may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

During a course of orthodontic treatment, it may be necessary to apply a force to a patient's teeth to generate movement of the tooth to bring the patient's teeth into a better occlusion. In many instances, it may not be possible to generate desired levels of such a force solely through the use of a tooth positioning appliance such as the tooth positioning appliance 10 described above. The forces generated by such a tooth positioning appliance can, however, be supplemented by the use of an orthodontic elastic member.

In accordance with an embodiment of the present invention, an orthodontic appliance, such as those described above, can be designed/configured for use in engagement with one or more elastic members. Such an appliance, can be configured to include one or more hooks for engagement with one or more elastic members. And a set of appliances can include one or more appliances with hooks.

Figure 2A:
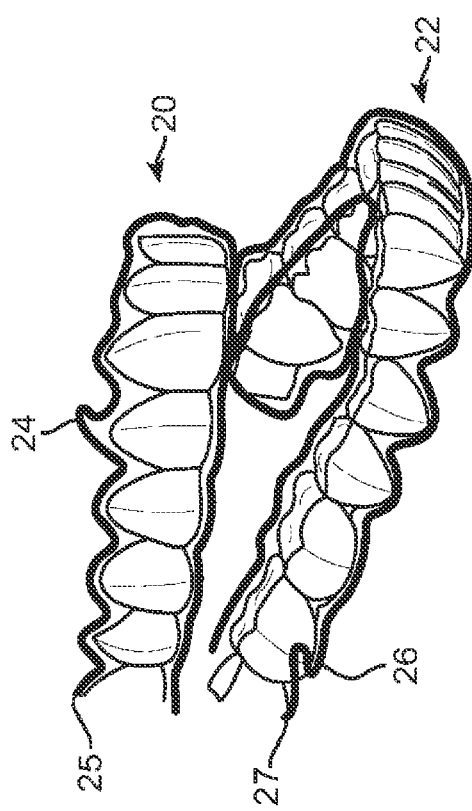
FIG. 2A illustrates upper and lower teeth received within incremental tooth positioning appliances having gingivally disposed hooks, in accordance to an embodiment.

FIG. 2A illustrates tooth positioning appliances 20, 22 for receiving, respectively, upper and lower teeth of a patient. Appliances 20, 22 include hooks 24, 26, respectively. Appliance 20 includes a gingival edge 25 of the appliance that substantially follows along a gingival margin of the patient's dentition as the appliance 20 is worn. Similarly, appliance 22 includes a gingival edge 27. The hooks 24, 26 extend gingivally or in a gingival direction relative to gingival edge 25, 27, respectively, and may be pointed in a mesial, distal, or vertical direction in the illustrated embodiment, hook 24 is pointed mesially and hook 26 is pointed distally. As noted above, such a gingivally offset configuration can maximize the surface area of the aligner material engaging the tooth received in an adjacent tooth receiving cavity. Hooks 24, 26 may further be offset laterally, e.g., to better accommodate an elastic member engaging the hook, as described further herein. In use, an orthodontic elastic member can be coupled between the hooks 24, 26, thereby applying a reciprocal force to each of the appliances 20, 22. One or more hooks can be incorporated into each of the appliances 20, 22 to apply one or more forces into the appliances. Such forces can be used to supplement the teeth repositioning forces generated, e.g., by engagement between the patient's teeth/tooth surfaces and surfaces of corresponding receiving cavities of the appliances 20, 22.

Figure 2B:
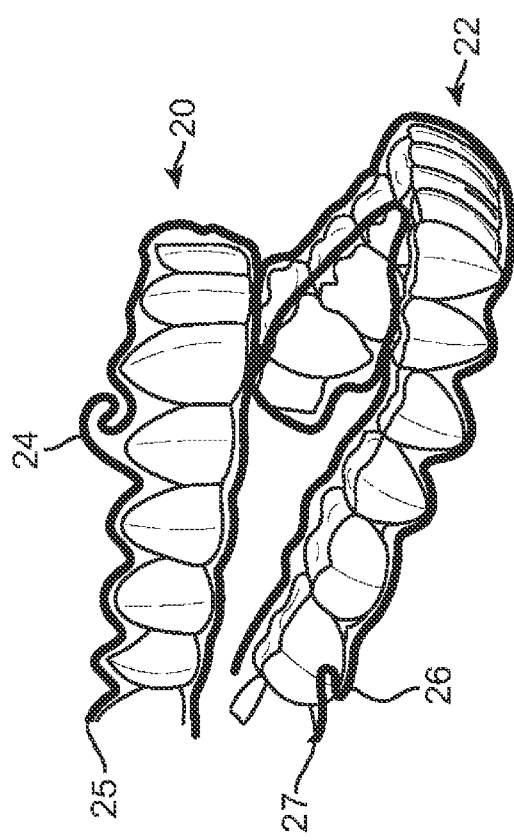
FIG. 2B illustrates upper and lower teeth received within incremental tooth positioning appliances having gingivally disposed hooks, wherein the hooks are configured to angle or curve more toward a tooth's surface, in accordance with an embodiment.

FIG. 2B illustrates positioning appliances 20, 22. The appliances 20, 22 include hooks 24, 26, respectively, wherein the hooks 24, 26 angle or curve back more toward tooth's surfaces compared to the embodiment illustrated in FIG. 2A. Hooks as in FIG. 2B may be selected, for example, to better avoid unwanted contact or poking of the patient's soft tissue.

Figure 3A:
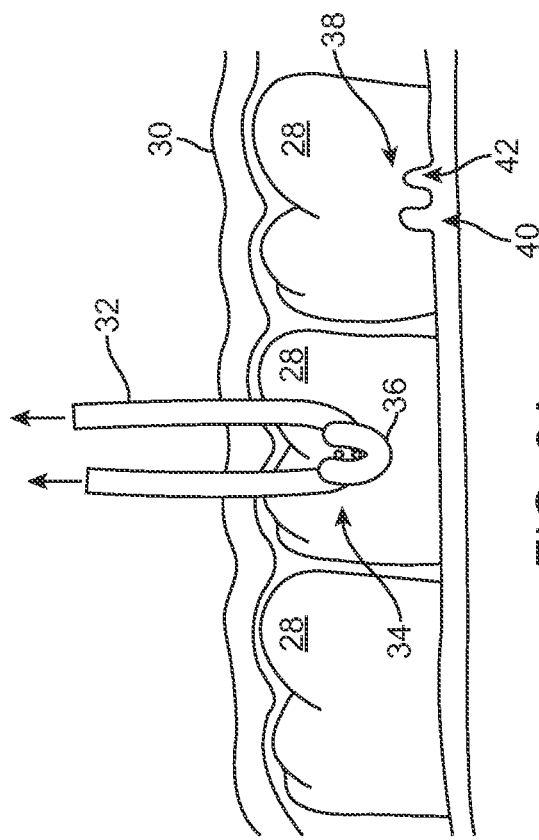
FIG. 3A illustrates teeth received within teeth receiving cavities of an incremental tooth positioning appliance and an orthodontic elastic member coupled with the positioning appliance. The appliance includes notches or hooks cut or formed into a tooth receiving cavity of the appliance.

FIG. 3A illustrates teeth 28 received within teeth receiving cavities of an incremental tooth positioning appliance 30. An orthodontic elastic member 32 is coupled with the tooth positioning appliance 30 via a hook 34 formed by creating a u-shaped aperture 36 located in the side of the appliance. The aperture 36 can be formed into an existing appliance at a location selected for the transfer of the force from the elastic member into the appliance. The aperture 36 can have a slot width and a shape selected to accommodate the elastic member. A hook 38 can also be positioned along a gingival margin of the appliance 30. The hook 38 can be formed, for example, via adjacent slots 40, 42 formed in the gingival margin of the appliance 30. Hooks 34 and 38 may be formed by simply cutting or trimming out material from a shell appliance. However, hooks formed by such an approach reduce appliance material or surfaces engaging a tooth received within an adjacent cavity and require deflection of appliance material forming the hook in order to accommodate a positioned elastic member (see, e.g., FIG. 3B).

Figure 3B:
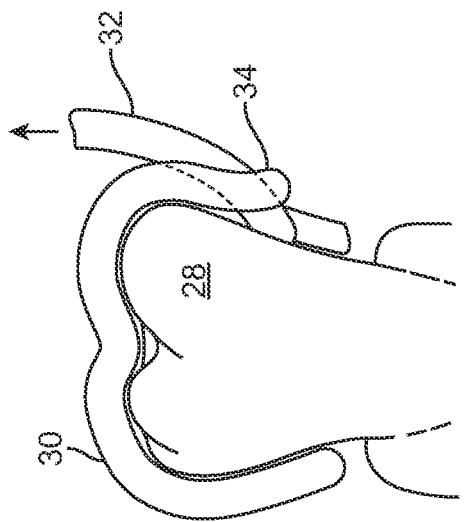
FIG. 3B is a cross-sectional view of a tooth and the positioning appliance of FIG. 3A illustrating hook displacement induced by the orthodontic elastic member.

FIG. 3B is a cross-sectional view of a tooth 28 and the positioning appliance 30 of FIG. 2A. Because the hook 34 is formed via the u-shaped aperture, when the elastic member 32 is coupled with the hook 34, the hook is forced to deflect away from the adjacent surface of the tooth 28 to accommodate the presence of the elastic member 32 between the hook 34 and the tooth 28. Additional deflection of the hook 34 may be induced by the force imparted into the hook by the elastic member 32. Such additional deflections can be controlled to some extent by shaping the overall width of the u-shaped aperture to produce a wider hook.

Figure 4A:
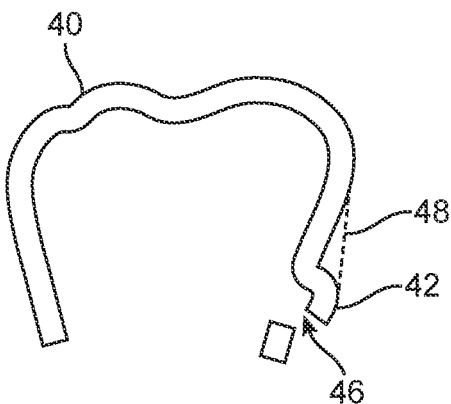
FIG. 4A is a cross-sectional view of an incremental tooth positioning appliance having an offset hook, in accordance with an embodiment of the present invention.
Figure 4B:
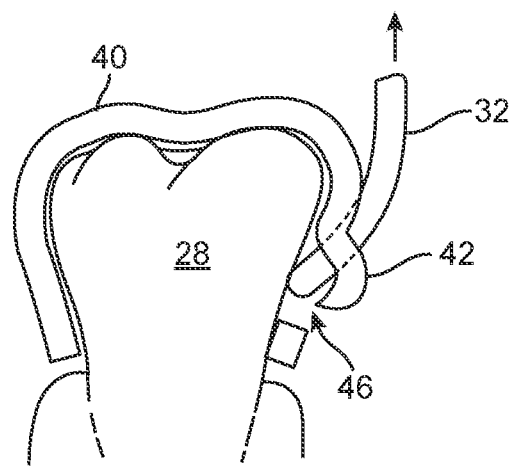
FIG. 4B illustrates a tooth received within a tooth receiving cavity of the incremental tooth positioning appliance of FIG. 4A and an orthodontic elastic member coupled with the offset hook, in accordance with an embodiment of the present invention.

FIG. 4A illustrates an incremental tooth positioning appliance 40 having an offset hook 42. FIG. 4B illustrates a tooth 28 received within a tooth receiving cavity of the incremental tooth positioning appliance 40 and an orthodontic elastic member 32 coupled with the offset hook 42. The offset hook 42 is offset from an adjacent surface of the tooth 28 (e.g., buccal surface, lingual surface) when the appliance 40 is coupled with the patient's teeth and no orthodontic elastic member is coupled with the hook. The offset can be configured to accommodate an elastic member with reduced deflection, in contrast to the hook 34 or 38 of FIGS. 3A and 3B. The hook 42 can be shaped to retain the elastic member in the absence of the elastic member being coupled with an opposing arch of the patient teeth. For example, the hook 42 can be shaped to trap the elastic member in contact with the surface of the tooth 28 (e.g., via a hook shaped to engage a sufficient portion of the perimeter of the elastic member), while still allowing installation of the elastic member into the trapping engagement of the hook 42 via an opening 46. The lateral offset may be configured such that the opening 46 is closer to the tooth than the maximum offset distance, in order that the offset allows the elastic to be engaged against the aligner without touching the tooth, but the hook does not protrude towards the soft tissue, thereby making the hook comfortable for the patient.

In one example, the tip of the hook may curve or angle away from soft tissue or back toward the tooth surface. The tip of the hook may also be curved, angled, or bent towards the gingival line such that the elastic may be placed into the aligner first before the aligner is worn, and the hook angle/curvature keeps the elastic from falling off of the aligner.

Figure 4C:
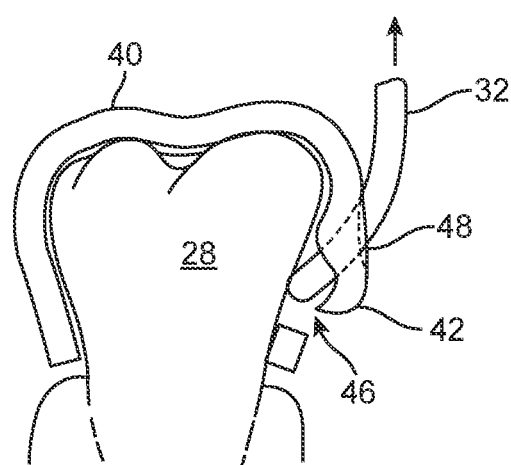
FIG. 4C illustrates a reinforced version of the offset hook of FIG. 4A, in accordance with an embodiment of the present invention.

The appliance 40 can optionally include a reinforcement structure in the vicinity of the hook 42 to reduce deflection induced by the force from the elastic member 32. For example, as illustrated in FIG. 4C, the appliance 40 can include a locally strengthened region 48 (e.g., via increased thickness in the area of the hook). The appliance 40 can also be locally stiffened by embedding a reinforcing structure (e.g., a stronger and stiffer material such as stainless steel or plastic resin filler) into the appliance to reinforce the appliance/hook against deflection induced by the force from the elastic member.

Figure 5:
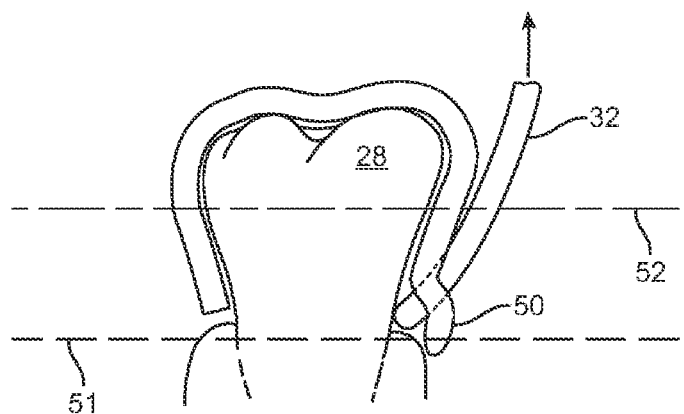
FIG. 5 illustrates a tooth received within a tooth receiving cavity of an incremental tooth positioning appliance having a gingivally disposed offset hook and an orthodontic elastic member coupled with the gingivally disposed hook, in accordance with an embodiment of the present invention.

As illustrated in FIG. 5, an offset hook 50 can also be disposed gingivally offset relative to a center of a clinical crown 52 of a tooth 28 as received in a cavity proximate to the hook 50, and may be gingivally offset relative to a gingival edge of the appliance or a gingival margin or line 51 identifying or approximating where gingival tissue meets the base of the tooth 28 crown. Such a gingival offset can be used to increase the surface area of the positioning appliance that engages the tooth 28, as well as to provide space for accommodating an elastic member 32 without necessarily requiring lateral deflection for elastic member engagement.

Figure 6:
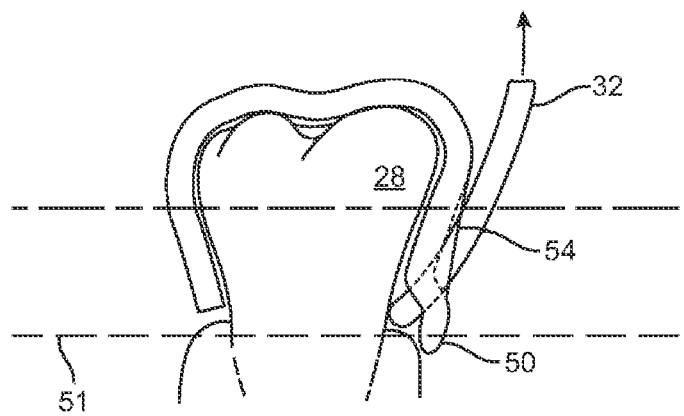
FIG. 6 illustrates a reinforced version of the gingivally disposed hook of FIG. 5, in accordance with an embodiment of the present invention.

As illustrated in FIG. 6, an appliance having such a gingivally offset hook 50 can include a locally reinforced area 54 (e.g., the appliance can be locally thickened in the vicinity of the offset hook) to reduce deflection of the hook 50 induced by the force from the elastic member. The appliance can also be locally stiffened by embedding a reinforcing structure (e.g., a stronger and stiffer material such as stainless steel or plastic resin) into the appliance to reinforce the appliance/hook against deflection induced by the force from the elastic member.

Figure 7:
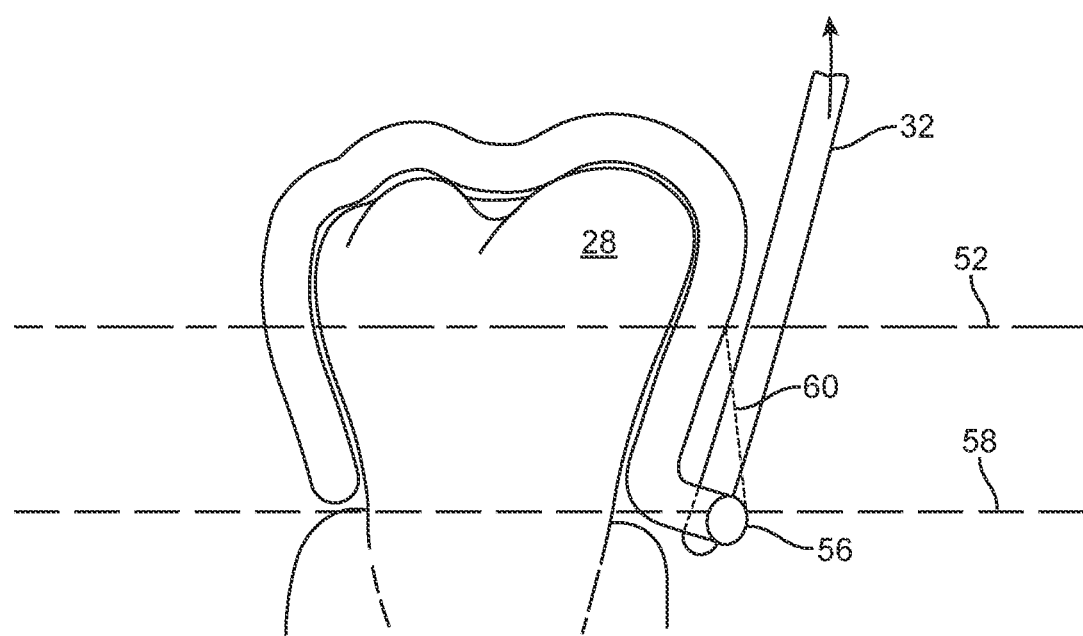
FIG. 7 illustrates a tooth received within a tooth receiving cavity of an incremental tooth positioning appliance having a gingivally disposed offset hook and an orthodontic elastic member coupled with the gingivally disposed hook, in accordance with an embodiment of the present invention.

FIG. 7 illustrates an offset hook 56 that is disposed even more gingivally offset relative to the center of a clinical crown 52 of a tooth 28 received in a cavity proximate to the hook 56 than the hook 50 shown in FIGS. 5 and 6. In addition to being more gingivally offset, the hook 56 is also offset further from the adjacent surface of the tooth 28 in order to be disposed at or below a gingival line 58 for the tooth 28. The appliance having such a gingivally offset hook 56 can include a locally reinforced area 60 (e.g., the appliance can be locally thickened in the vicinity of the offset hook) to reduce deflection of the hook 56 induced by the force from the elastic member 32.

Figure 8A:
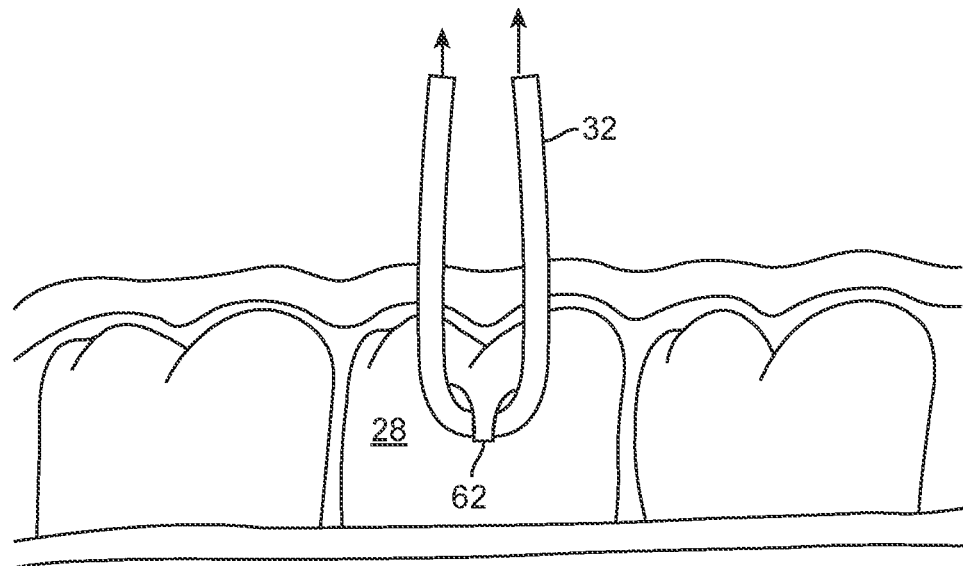
FIG. 8A illustrates teeth received within teeth receiving cavity of an incremental tooth positioning appliance having an exterior hook and an orthodontic elastic member coupled with the exterior hook, in accordance with an embodiment of the present invention.
Figure 8B:
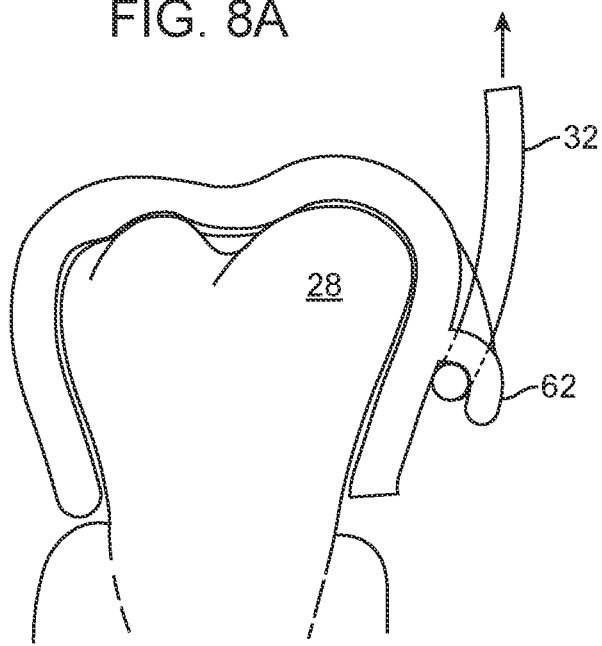
FIG. 8B is a cross-sectional view of a tooth and the positioning appliance of FIG. 8A illustrating the orthodontic elastic member coupled with the exterior hook, in accordance with an embodiment of the present invention.
Figure 9A:
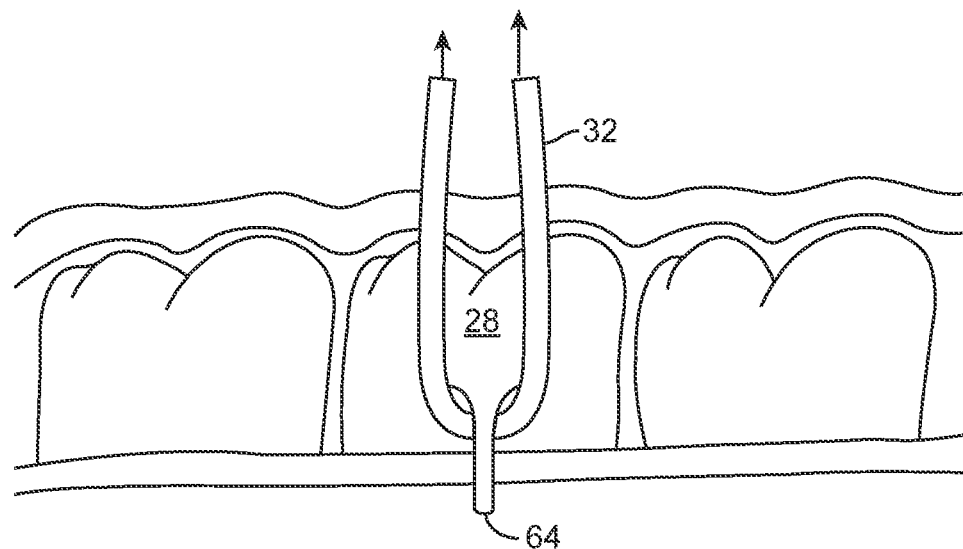
FIG. 9A illustrates teeth received within teeth receiving cavities of an incremental tooth positioning appliance having a gingivally disposed exterior hook and an orthodontic elastic member coupled with the gingivally disposed exterior hook, in accordance with an embodiment of the present invention.
Figure 9B:
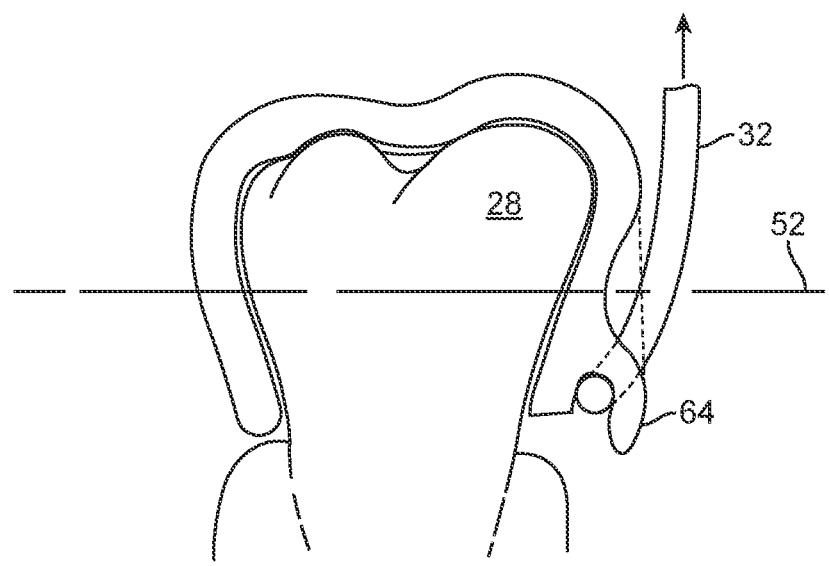
FIG. 9B is a cross-sectional view of a tooth and the positioning appliance of FIG. 9A illustrating the orthodontic elastic member coupled with the gingivally disposed exterior hook, in accordance with an embodiment of the present invention.

An appliance can be configured with an exterior offset hook that couples with an elastic member such that the elastic member does not contact a surface of the tooth. FIGS. 8A and 8B illustrate an exterior offset hook 62 positioned similar to the offset hook 42 illustrated in FIGS. 4A through 4C. FIGS. 9A and 9B illustrate an exterior offset hook 64 offset gingivally similar to the offset hook illustrated in FIGS. 5 and 6. A positioning appliance can be configured with such an exterior offset hook by incorporating additional material on the exterior of a basic positioning appliance such as the appliance 10 illustrated in FIG. 1. Exterior hooks can also be locally reinforced, for example, via locally thickened areas as illustrated in FIGS. 8B and 9B.

Figure 10:
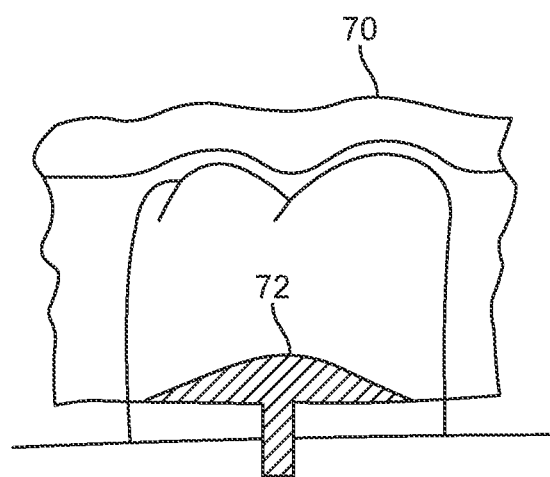
FIG. 10 illustrates an incremental tooth positioning appliance having a reinforcing corrugation and an exterior hook coupled with an orthodontic elastic member, in accordance with an embodiment of the present invention.

A tooth repositioning appliance can also include a reinforcement structure to stiffen the appliance against deflection induced by the force from an elastic member. For example, FIG. 10 illustrates a repositioning appliance 70 having a reinforcing corrugation 72 formed along a gingival edge of the repositioning appliance. The corrugation 72 can be formed by adding an elongated protrusion to a male mold prior to forming the appliance over the male mold. A corrugation can be used to stiffen the gingival edge of the repositioning appliance against lateral deflection induced by the force from the elastic member 32.

The present invention further provides methods for using one or more orthodontic positioning devices having one or more hooks configured to interface with an orthodontic elastic member so as to react a force from the elastic member into the patient-worn device. The above-described orthodontic positioning devices can be configured for use in practicing orthodontic treatment or tooth repositioning methods. For example, a first orthodontic positioning device can be provided, the device having a hook configured to interface with an orthodontic elastic member is received (e.g., by a patient, by a dental professional, etc.), e.g., as described above. The first positioning device is coupled with a first arch of the patient's teeth. An orthodontic elastic member is coupled with the hook of the first positioning device to transfer a force from the elastic member into the first positioning device. A second orthodontic positioning device having a hook configured to interface with an orthodontic elastic member is received. The second orthodontic positioning device is coupled with a second arch of the patient's teeth, and the orthodontic elastic member that is coupled with the hook of the first positioning device is coupled with the hook of the second positioning device. Methods can include use of a plurality of different (e.g., successive) positioning devices or appliances.

The present invention further provides systems for repositioning a patient's teeth. A system can include a plurality of orthodontic tooth positioning appliances. Consistent with discussion provided further herein, at least two of the appliances can have different teeth receiving cavities shaped to receive and resiliently reposition the patient's teeth in a first arch of the patient's teeth from a first arrangement to a successive arrangement. At least one of the appliances includes a hook configured to interface with an orthodontic elastic member so as to react a force from the elastic member into the patient-worn appliance. The hook can be configured to be offset from a surface of a tooth when the appliance is coupled with the patient's teeth in the first arch and no orthodontic elastic member is coupled with the hook.

A system can include a plurality appliances, or sets of appliances, for repositioning a patient's upper and lower arch teeth. For example, one of a plurality of upper arch appliances and one of a plurality of lower arch appliances can be configured to be worn simultaneously and coupled with each other via an orthodontic elastic member coupling the hook of the upper arch appliance to the hook of the lower arch appliance. The elastic member may also be coupled within the same arch in order to connect the elastic to an elastic hook that may be directly bonded to an exposed tooth elsewhere in the arch, whereby the aligner has been cut around that tooth-affixed elastic hook. The elastic member may also be coupled from the aligner to an anchorage device attached somewhere in the mouth such as a mini-implant or temporary anchorage device (TAD) affixed to the patient's jaw structure.

The present invention further provides methods, such as a computer-implemented methods, for designing an orthodontic positioning device having teeth receiving cavities. Such a method can be used to design the above-described orthodontic positioning devices. A method can include providing and/or receiving a digital representation of the patient's teeth in a selected arrangement. The arrangement can be selected to define the shape of teeth receiving cavities shaped to receive and apply a resilient positioning force to a patient's teeth. An appliance can be modeled based on the received representation. The received representation can be used to define the teeth receiving cavities of the appliance. The appliance is modeled to include a hook configured to interface with an orthodontic elastic member so as to react a force from the elastic member into the appliance, including hook designs or configurations as indicated further herein. For example, the modeled hook can be configured such that it is offset (e.g., laterally) from a surface of a tooth when the appliance is coupled with the patient's teeth and no orthodontic elastic member is coupled with the hook. The hook may alternatively or additionally be gingivally offset, e.g., relative to a gingival edge of the model appliance or a gingival line of the patient. A reinforcement structure may further be designed or modeled so as to stiffen the appliance against lateral deflection induced by the force from the elastic member can optionally be modeled into the appliance. The reinforcement structure can include, for example, a corrugation (e.g., positioned along a gingival edge of the appliance to increase the bending stiffness of the gingival edge). The reinforcement structure can include a locally reinforced area (e.g., locally thickened) connected with the hook to stiffen the hook against deflection induced by the force from the elastic member.

An aligner having an exterior hook can be created using automated steps, manual steps, and/or a combination of automated and manual steps. Such steps can include, for example, the removal of material from an aligner assembly (e.g., using a physical cutter such as an end mill, a drill, and a punch; using non-contact removal techniques such as laser cutting, and electrical discharge machining (EDM); using other media such as water jets, hot water, and hot gases); the addition of material to an aligner assembly (e.g., by bonding or attaching a pre-formed feature such as a hook); and/or direct fabrication techniques (e.g., stereo lithography).

Figure 11:
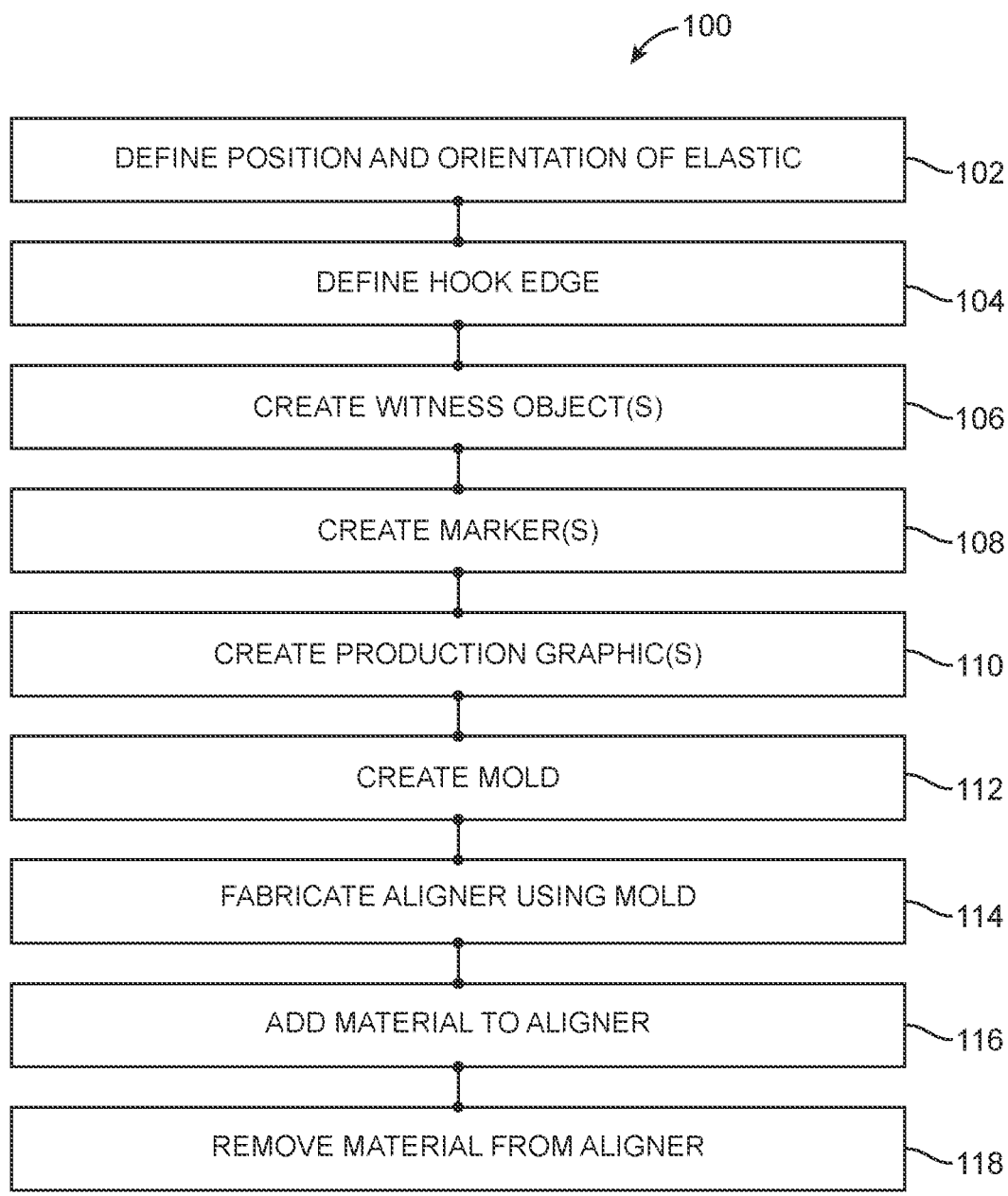
FIG. 11 is a simplified block diagram illustrating a method for fabricating an aligner having an exterior hook using a mold, in accordance with an embodiment of the present invention.

FIG. 11 illustrates a method 100 for indirect fabrication of an aligner having a hook by forming a sheet of material over a mold. The geometry of the mold includes representations of a patient's teeth in an arrangement suitable to generate desired teeth receiving cavities. A witness object is added to the teeth representations to generate an inner surface of an offset hook portion of the aligner. While some of the steps of method 100 are described as being computer-implemented, the alternate use of non-computer implemented approaches may also be apparent to a person of skill in the art. The method 100 can be used to generate the appliances disclosed above.

In step 102, the position and orientation of an elastic member relative to the aligner is defined. The defined position and orientation of the elastic member can be generated, for example, using computer-based 3-dimensional planning/design tools, such as Treat® from Align Technology, Inc. Computer modeling of one or successive tooth arrangements for a patient's upper and lower teeth can be used to position/orient an elastic member between an upper jaw appliance hook (or a feature attached to an upper jaw tooth) and a lower jaw appliance hook (or a feature attached to a lower jaw tooth). While the elastics shown in the figures are oriented generally vertically, other orientations are possible (e.g., to couple non-occluding pairs of teeth). An elastic member can be positioned so as to generate supplemental forces to treat certain types of malocclusion (e.g., class II and III corrections, canine rotation, extrusion, etc.).

Figure 12A:
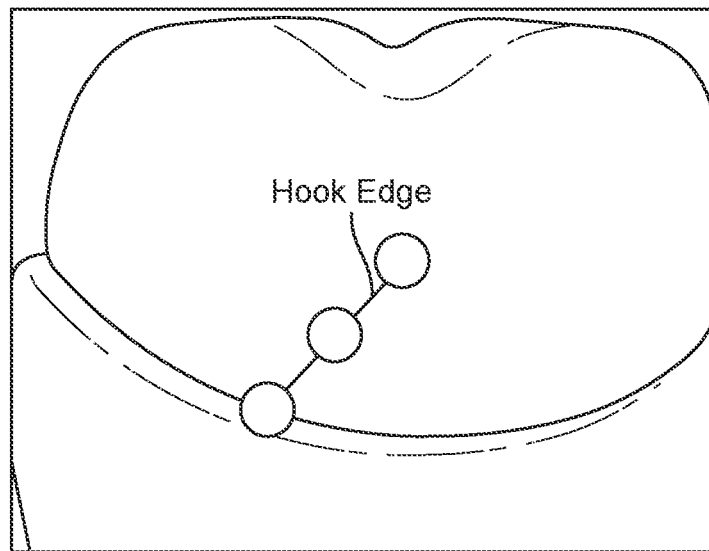
FIGS. 12A and 12B illustrate the addition of a hook edge (12A) and a witness object (12B) to mold geometry used to generate an appliance having an offset hook, in accordance with an embodiment of the present invention.
Figure 12B:
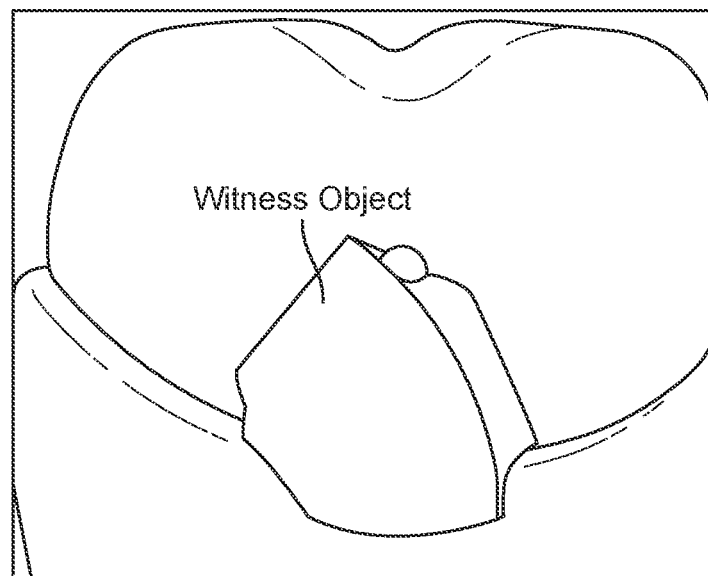

In step 104, a hook edge is defined relative to the mold geometry using the defined position/orientation of the elastic member. The hook edge definition can be a spline on a tooth surface in a 3-dimensional model. The hook edge can be used to position and orient a witness object created in step 106. FIGS. 12A and 12B illustrate a hook edge definition and a witness object positioned and oriented using the hook edge definition and a corresponding tooth surface. The witness object is shaped to generate a suitable offset from the tooth surface to generate a corresponding offset in the inner surface of the aligner. An area of the aligner that will interface with the elastic member to hold the elastic member can be determined. Based on the determined area, the witness object can be created that corresponds to the determined area and merged into the 3-dimensional representation of the patient's teeth. The witness object can be merged into a gingival surface included in the 3-dimensional representation of the patient's teeth, and appropriate smoothing applied. The resulting 3-dimensional representation (mold geometry) can be used to generate a positive mold over which a sheet of material is formed to create an aligner.

In step 108, one or more markers can optionally be created/added to the mold geometry to generate a reference feature(s) in an aligner that can be used to guide subsequent removal of material from the aligner (e.g., see step 118 below) and/or to guide subsequent addition of material to the aligner (e.g., see step 116 below). Further, a production graphic(s) (e.g., a screenshot on a computer monitor or paper) can optionally be generated from the mold geometry in step 110 to, for example, guide subsequent removal of material from the aligner and/or to guide subsequent addition of material to the aligner.

The mold geometry is then used to create a physical mold, which is used to form a sheet of elastomeric material to form the aligner. In step 112, a mold is created from the 3-dimensional mold geometry. The mold can be created, for example, directly using automated fabrication techniques (e.g., stereo lithography). In step 114, the aligner is fabricated by molding a sheet of material over the physical mold.

Once the basic aligner shell is fabricated, material can be optionally added and/or removed from the aligner to finalize the geometry of the hook. In step 116, material can be optionally added to the aligner to, for example, form part or all of the hook structure. For example, a preformed feature can be bonded or otherwise attached to the aligner to serve as the hook. In step 118, material can be optionally removed from the aligner to complete the formation of the offset hook. For example, localized portions of the aligner can be removed to accommodate the elastic member when installed on the hook.

Figure 13:
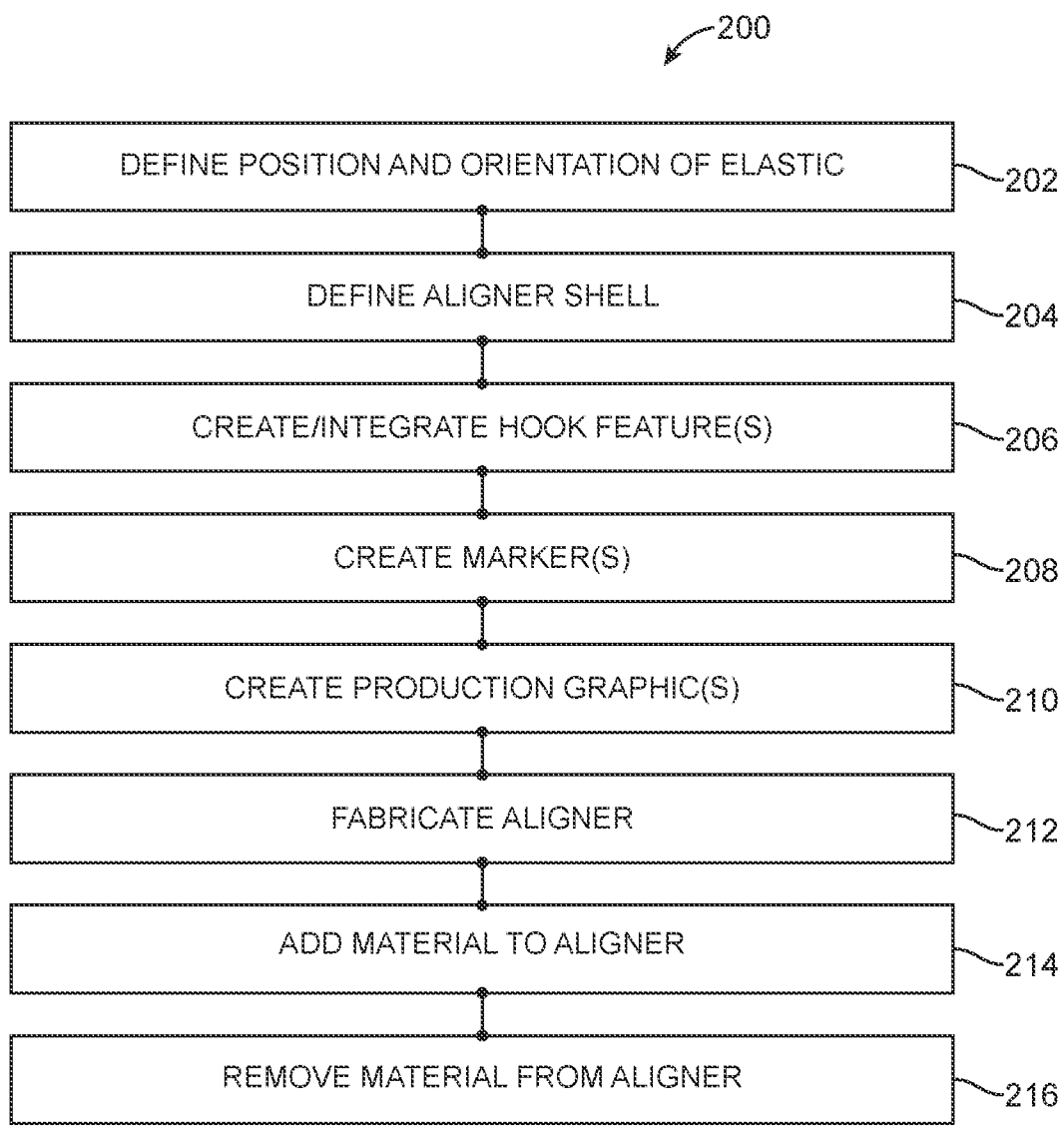
FIG. 13 is a simplified block diagram illustrating a method for direct fabrication of an aligner having an exterior hook, in accordance with an embodiment of the present invention.

FIG. 13 illustrates a method 200 for direct fabrication of an aligner having a hook, for example, via direct fabrication from a 3-dimensional representation of the aligner. Suitable direct fabrication techniques (e.g., stereo lithography) can be used. Because some of the steps of the method 200 are similar to corresponding steps of the method 100 of FIG. 11, detailed description of such steps is not repeated here. While some of the steps of method 200 are described as being computer-implemented, the alternate use of non-computer implemented approaches may also be apparent to a person of skill in the art. The method 200 can be used to generate the appliances disclosed above.

In step 202, the position and orientation of an elastic member relative to the aligner is defined. The discussion above regarding step 102 is applicable to step 202.

In step 204, an aligner shell is defined using a 3-dimensional representation of a patient's teeth. A computer program can be used to define a 3-dimensional representation of the aligner shell using representations of the patient's teeth to define the teeth receiving cavities of the aligner shell. The outer surfaces of the aligner shell can be defined, for example, using suitable offsets from the surfaces of the teeth.

In step 206, the definition of the aligner shell is modified to incorporate a hook feature, for example, one of the above disclosed hook features. To provide for efficient incorporation of such a hook feature, pre-defined digital objects can be positioned, oriented, and/or scaled relative to the aligner shell definition and then merged into the aligner shell definition. Additional material can be added and/or removed from the resulting aligner definition using known methods.

In step 208, one or more markers can optionally be created/added to the aligner definition as discussed above with respect to step 108 of the method 100. Likewise, in step 210, production graphics can be created and used as discussed above with respect to step 110 of the method 100.

In step 212, the resulting 3-dimensional representation of the aligner is used to directly fabricate the aligner. A suitable direct fabrication method, such as known rapid prototyping approaches (e.g., stereo lithography) can be used.

In step 214, material can be added to the resulting aligner as discussed above with respect to step 116 of the method 100. Likewise, in step 216, material can be removed from the resulting aligner as discussed above with respect to step 118 of the method 100.

An alternative reinforcement technique provides marked regions in the refractory model (the stereolithography model) whereby protrusions or recessed areas are designed to hold wires and/or plastic resin, which are inserted into the model, such that when the aligner sheet material is formed over the model, the reinforcements are "picked up" by the plastic formed over the reinforcements. The aligner is trimmed according to specification, leaving the reinforcement embedded into the hook region of the aligner.

Figure 14:
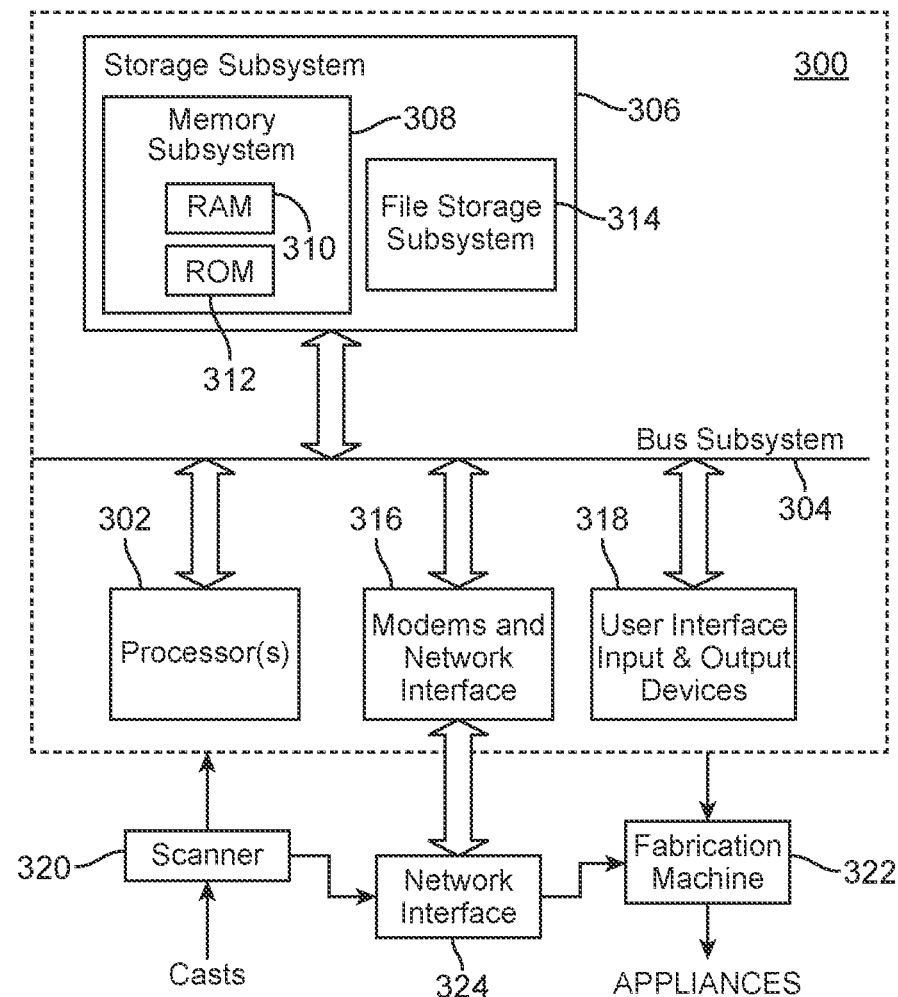
FIG. 14 diagrammatically illustrates a fabrication system in accordance with an embodiment of the present invention.

FIG. 14 is a simplified block diagram of a data processing system 300 embodying the present invention. Data processing system 300 typically includes at least one processor 302 which communicates with a number of peripheral devices via bus subsystem 304. These peripheral devices typically include a storage subsystem 306 (memory subsystem 308 and file storage subsystem 314), a set of user interface input and output devices 318, and an interface to outside networks 316, including the public switched telephone network. This interface is shown schematically as "Modems and Network Interface" block 316, and is coupled to corresponding interface devices in other data processing systems via communication network interface 324. Data processing system 300 could be a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touch screen incorporated into the display. Other types of user interface input devices, such as voice recognition systems, are also possible.

User interface output devices typically include a printer and a display subsystem, which includes a display controller and a display device coupled to the controller. The display device may be a cathode ray tube (CRT), a flat-panel device such as a liquid crystal display (LCD), or a projection device. The display subsystem may also provide non-visual display such as audio output.

Storage subsystem 306 maintains the basic programming and data constructs that provide the functionality of the present invention. The software modules discussed above are typically stored in storage subsystem 306. Storage subsystem 306 typically comprises memory subsystem 308 and file storage subsystem 314.

Memory subsystem 308 typically includes a number of memories including a main random access memory (RAM) 310 for storage of instructions and data during program execution and a read only memory (ROM) 312 in which fixed instructions are stored. In the case of Macintosh-compatible personal computers the ROM would include portions of the operating system; in the case of IBM-compatible personal computers, this would include the BIOS (basic input/output system).

File storage subsystem 314 provides persistent (non-volatile) storage for program and data files, and typically includes at least one hard disk drive and at least one disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 304 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 320 is responsible for scanning casts of the patient's teeth obtained either from the patient or from an orthodontist and providing the scanned digital data set information to data processing system 300 for further processing. In a distributed environment, scanner 320 may be located at a remote location and communicate scanned digital data set information to data processing system 300 via network interface 324.

Fabrication machine 322 can encompass a range of fabrication machines and methods used to fabricate positive molds for the above-described repositioning appliances or directly fabricate the above-described repositioning appliances based on data set information received from data processing system 300. In a distributed environment, fabrication machine 322 may be located at a remote location and receive data set information from data processing system 300 via network interface 324.

It is understood that the examples and embodiments described herein are for illustrative purposes and that various modifications or changes in light thereof will be suggested to persons skilled in the art and are to be included within the spirit and purview of this application and the scope of the appended claims. Numerous different combinations of the illustrated or described embodiments are possible, including combinations of any aspects of the different described embodiments. Such combinations are considered to be part of the present invention.

What is claimed is:

1. A method of providing orthodontic treatment, the method comprising:
   receiving an initial dentition model of a patient's teeth in an initial arrangement;
   generating an orthodontic treatment plan for orthodontic treatment of the patient's teeth, the orthodontic treatment plan comprising a plurality of removable polymeric aligners,
      wherein the plurality of removable polymeric aligners, when worn sequentially, are configured to reposition the patient's teeth from the initial arrangement to a target arrangement;
   determining a shape of a first polymeric aligner of the plurality of removable polymeric aligners, wherein the first polymeric aligner, when worn, is configured to reposition the patient's teeth from the initial arrangement to a second arrangement as part of the orthodontic treatment plan;
   determining a position of a first hook based on the initial arrangement of the patient's teeth, wherein the first hook is to be disposed on the first polymeric aligner, and wherein the first hook is configured to engage with an elastic member to facilitate repositioning of the patient's teeth from the first arrangement to the second arrangement, wherein the elastic member is separate from the first polymeric aligner;
   providing a visualization of the position of the first hook, wherein the visualization is configured to be displayed relative to a digital model of the patient's teeth without displaying a model of the first polymeric aligner; and
   fabricating the plurality of removable polymeric aligners.

2. The method of claim 1, the method further comprising providing the digital model of the patient's teeth.

3. The method of claim 2, wherein the digital model of the patient's teeth comprises a 3D model.

4. The method of claim 1, wherein fabricating the plurality of removable polymeric aligners comprises direct fabrication.

5. The method of claim 1, wherein fabricating the plurality of removable polymeric aligners comprises fabricating the first polymeric aligner.

6. The method of claim 5, wherein fabricating the first polymeric aligner comprises forming the first hook on the first polymeric aligner.

7. The method of claim 6, wherein the first hook is formed by adding or removing material.

8. The method of claim 6, wherein the first hook is formed by making a cut on the first polymeric aligner.

9. The method of claim 8, wherein the cut is made at a location corresponding to the visualization of the position of the first hook.

10. The method of claim 8, wherein the cut is made via manual cutting or laser cutting.

11. The method of claim 6, wherein the first hook is formed by creating a u-shaped aperture on the first polymeric aligner.

12. The method of claim 1, the method further comprising determining the orientation of the first hook relative to the first polymeric aligner.

13. The method of claim 1, the method further comprising determining the shape of the first hook relative to the first polymeric aligner.

14. The method of claim 1, the method further comprising:
   determining a shape of a second polymeric aligner of the plurality of removable polymeric aligners, wherein the second polymeric aligner, when worn, is configured to reposition the patient's teeth from the second arrangement to a third arrangement as part of the orthodontic treatment plan; and
   determining a position of a second hook to be disposed on the second polymeric aligner.

15. The method of claim 1, the method further comprising:
   determining shapes of the plurality of removable polymeric aligners; and
   determining positions of hooks corresponding to each of the plurality of removable polymeric aligners; and
   wherein the shapes of the plurality of removable polymeric aligners and positions of hooks corresponding to each of the plurality of removable polymeric aligners are determined prior to orthodontic treatment of the patient's teeth.

16. The method of claim 1, wherein at least one of the plurality of removable polymeric aligners is configured to provide an overcorrection of a patient's tooth as part of the orthodontic treatment plan.

17. The method of claim 1, wherein fabricating the plurality of removable polymeric aligners occurs prior to initiation of the orthodontic plan.

18. The method of claim 1, wherein the shape of the first polymeric aligner comprises a reinforcement structure, and wherein the reinforcement structure is configured to reduce deflection induced by the elastic member on the first hook.

19. The method of claim 1, wherein the visualization of the position of the first hook is provided without displaying the hook in its entirety.

20. A method of providing orthodontic treatment, the method comprising:
   receiving an initial dentition model of a patient's teeth in an initial arrangement;
   generating an orthodontic treatment plan for orthodontic treatment of the patient's teeth, the orthodontic treatment plan comprising a plurality of removable polymeric aligners,
      wherein the plurality of removable polymeric aligners, when worn sequentially, are configured to reposition the patient's teeth from the initial arrangement to a target arrangement;
   determining a shape of a first polymeric aligner of the plurality of removable polymeric aligners, wherein the first polymeric aligner, when worn, is configured to reposition the patient's teeth from the initial arrangement to a second arrangement as part of the orthodontic treatment plan;
   determining a position of a first hook to be disposed on the first polymeric aligner, and wherein the first hook is configured to engage with an elastic member to facilitate repositioning of the patient's teeth from the first arrangement to the second arrangement, wherein the elastic member is separate from the first polymeric aligner;
   providing a visualization of the position of the first hook, wherein the visualization is configured to be displayed relative to a digital model of the patient's teeth without displaying a model of the first polymeric aligner;
   determining a shape of a second polymeric aligner of the plurality of removable polymeric aligners, wherein the second polymeric aligner, when worn, is configured to reposition the patient's teeth from the second arrangement to a third arrangement as part of the orthodontic treatment plan;
   determining a position of a second hook to be disposed on the second polymeric aligner, wherein the position of the second hook is incrementally adjusted from the position of the first hook; and
   fabricating the first polymer aligner and the second polymeric aligner.

21. The method of claim 20, wherein the visualization of the position of the first hook is provided without displaying the hook in its entirety.

22. A method of providing orthodontic treatment, the method comprising:
   receiving an initial dentition model of a patient's teeth in an initial arrangement;
   generating an orthodontic treatment plan for orthodontic treatment of the patient's teeth, the orthodontic treatment plan comprising a plurality of removable polymeric aligners,
      wherein the plurality of removable polymeric aligners, when worn sequentially, are configured to reposition the patient's teeth from the initial arrangement to a target arrangement;
   determining a shape of a first polymeric aligner of the plurality of removable polymeric aligners, wherein the first polymeric aligner, when worn, is configured to reposition the patient's teeth from the initial arrangement to a second arrangement as part of the orthodontic treatment plan;
   determining a position of a first hook to be disposed on the first polymeric aligner, wherein the first hook is configured to engage with an elastic member to facilitate repositioning of the patient's teeth from the first arrangement to the second arrangement, wherein the elastic member is separate from the first polymeric aligner;
   providing a visualization of the position of the first hook, wherein the visualization is configured to be displayed relative to a digital model of the patient's teeth without displaying a model of the first polymeric aligner, wherein the visualization comprises a line; and
   fabricating the plurality of removable polymeric aligners.

23. The method of claim 22, wherein the visualization of the position of the first hook is provided without displaying the hook in its entirety.

* * * * *